United States Patent
Sarkar et al.

(10) Patent No.: US 10,089,163 B2
(45) Date of Patent: Oct. 2, 2018

(54) AUTOMATIC DISCOVERY AND PRIORITIZATION OF FAULT DOMAINS

(71) Applicant: VMWARE, INC., Palo Alto, CA (US)

(72) Inventors: Prasenjit Sarkar, Singapore (SG);
Vineet Kumar Sinha, Bangalore (IN);
Prashant Kumar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 178 days.

(21) Appl. No.: 14/930,683

(22) Filed: Nov. 3, 2015

(65) Prior Publication Data

US 2016/0371135 A1 Dec. 22, 2016

(30) Foreign Application Priority Data

Jun. 17, 2015 (IN) .......................... 3025/CHE/2015

(51) Int. Cl.
*G06F 11/00* (2006.01)
*G06F 11/07* (2006.01)

(52) U.S. Cl.
CPC ...... *G06F 11/0709* (2013.01); *G06F 11/0712* (2013.01); *G06F 11/0793* (2013.01)

(58) Field of Classification Search
CPC ............. G06F 11/0709; G06F 11/0712; G06F 11/0793; G06F 11/0703; G06F 11/0706; G06F 9/5061; G06F 9/5066; G06F 9/5077; H04L 67/10; H04L 67/101; H04L 67/1023; H04L 67/1034; H04L 41/0654; H04L 41/08; H04L 41/0803; H04L 41/0806; H04L 41/0823; H04L 41/0836
See application file for complete search history.

(56) References Cited

U.S. PATENT DOCUMENTS

| | | | |
|---|---|---|---|
| 7,409,676 B2 * | 8/2008 | Agarwal | G06F 11/008 707/999.1 |
| 2006/0045027 A1 * | 3/2006 | Galou | H04L 41/12 370/255 |
| 2013/0042139 A1 * | 2/2013 | Bhalerao | G06F 11/0709 714/2 |
| 2016/0142266 A1 * | 5/2016 | Carroll | H04L 41/16 706/12 |

FOREIGN PATENT DOCUMENTS

WO WO-2013139678 A1 * 9/2013 ............. H04L 43/04

* cited by examiner

*Primary Examiner* — Bryce P Bonzo
*Assistant Examiner* — Anthony J Amoroso

(57) ABSTRACT

A recovery management system and recovery method uses dependency information between clients running in a distributed computer system to automatically determine logical fault domains for the clients. The logical fault domains are then prioritized for a recovery process.

30 Claims, 23 Drawing Sheets

| INDEX | 1 | 2 | 3 | 4 | 5 | 6 | 7 | 8 | 9 | 10 | 11 |
|---|---|---|---|---|---|---|---|---|---|---|---|
| visited | 1 | 0 | 0 | 0 | 0 | 0 | 0 | 0 | 0 | 0 | 0 |
| root | 1 | 0 | 0 | 0 | 0 | 0 | 0 | 0 | 0 | 0 | 0 |
| fault_domain | 1 | 1 | 0 | 0 | 0 | 0 | 0 | 0 | 0 | 0 | 0 | visited[1]=1
fault_domain[2]=3

| INDEX | 1 | 2 | 3 | 4 | 5 | 6 | 7 | 8 | 9 | 10 | 11 |
|---|---|---|---|---|---|---|---|---|---|---|---|
| visited | 1 | 1 | 0 | 1 | 1 | 1 | 0 | 0 | 0 | 0 | 0 |
| root | 1 | 0 | 0 | 0 | 0 | 1 | 0 | 0 | 0 | 0 | 0 |
| fault_domain | 1 | 1 | 0 | 1 | 1 | 6 | 6 | 0 | 0 | 0 | 0 | visited[6]=1
fault_domain[7]=6

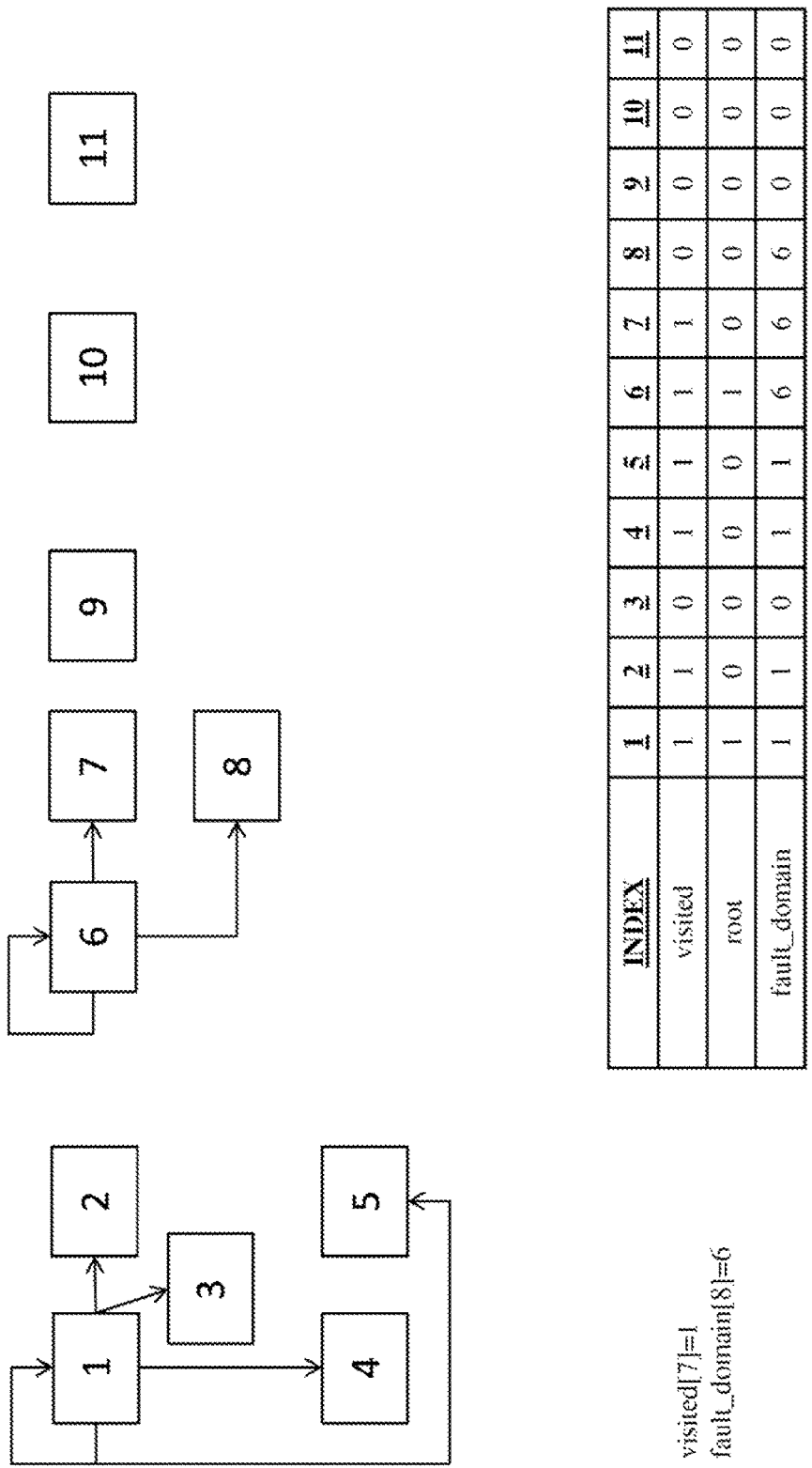

| INDEX | 1 | 2 | 3 | 4 | 5 | 6 | 7 | 8 | 9 | 10 | 11 |
|---|---|---|---|---|---|---|---|---|---|---|---|
| visited | 1 | 1 | 0 | 1 | 1 | 1 | 1 | 1 | 1 | 0 | 0 |
| root | 1 | 0 | 0 | 0 | 0 | 1 | 0 | 0 | 0 | 10 | 0 |
| fault_domain | 1 | 1 | 0 | 1 | 1 | 6 | 6 | 6 | 6 | 10 | 0 | root[10]=1
fault_domain[10]=10 visited[11]=1

| INDEX | 1 | 2 | 3 | 4 | 5 | 6 | 7 | 8 | 9 | 10 | 11 |
|---|---|---|---|---|---|---|---|---|---|---|---|
| visited | 1 | 1 | 1 | 1 | 1 | 1 | 1 | 1 | 1 | 1 | 1 |
| root | 1 | 0 | 0 | 0 | 0 | 1 | 0 | 0 | 0 | 10 | 0 |
| fault_domain | 1 | 1 | 1 | 1 | 1 | 6 | 6 | 6 | 6 | 10 | 10 |

AUTOMATIC DISCOVERY AND PRIORITIZATION OF FAULT DOMAINS

RELATED APPLICATIONS

Benefit is claimed under 35 U.S.C. 119(a)-(d) to Foreign application Serial No. 3025/CHE/2015 filed in India entitled "AUTOMATIC DISCOVERY AND PRIORITIZATION OF FAULT DOMAINS", on Jun. 17, 2015, by VMware, Inc., which is herein incorporated in its entirety by reference for all purposes.

BACKGROUND

Virtualized infrastructures are widely used to provide large scale services, which involve executing large scale applications, such as multi-tier applications. These large scale applications require multiple virtual machines, some of which are dependent on each other to function properly. These dependencies between application virtual machines can be referred to as logical fault domains. As used herein, a logical fault domain is a set of application virtual machines that shares a single point of failure.

The virtual machines for each logical fault domain must be protected together against failures, such as network fault or server death, to ensure that the application can run properly. If these virtual machines for different logical fault domains, which are tied up together, are not protected together, then the entire service provided by the large scale application may not be unavailable. For an example, let's assume that there is a large scale application with a simple 3-tier architecture of a web virtual machine, an application virtual machine and a database virtual machine, and all three of these virtual machines are running on the same host computer. In this example, all three virtual machines are in a single fault domain. If a fault strikes the host computer and not all three virtual machines are restarted for any reason, then the entire service provided by the large scale application may not function properly since all three virtual machines are needed for the service to operate properly.

Currently, high availability (HA) or fault domain managers (FDM) are implemented to handle failures. However, in order for the HA or FDM to effectively handle failures, an administrator or user must manually input settings to define logical fault domains and prioritizations for various virtual machines that run large scale applications, which introduces errors and inefficiencies.

SUMMARY

A recovery management system and recovery method uses dependency information between clients running in a distributed computer system to automatically determine logical fault domains for the clients. The logical fault domains are then prioritized for a recovery process.

A recovery method in accordance with an embodiment of the invention comprises obtaining dependency information between clients running in a distributed computer system automatically determining logical fault domains for the clients using the dependency information, and prioritizing the logical fault domains for a recovery process based on at least one characteristic of the logical fault domains. In some embodiments, the steps of this method are performed when program instructions contained in a computer-readable storage medium is executed by one or more processors.

A recovery management system in accordance with an embodiment of the invention comprises a discovery module, a topology module and a prioritization module. The discovery module is configured to obtain dependency information between clients running in the distributed computer system. The topology module is configured to automatically determine logical fault domains for the clients using the dependency information. The prioritization module is configured to prioritize the logical fault domains for a recovery process based on at least one characteristic of the logical fault domains.

Other aspects and advantages of embodiments of the present invention will become apparent from the following detailed description, taken in conjunction with the accompanying drawings illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawing the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
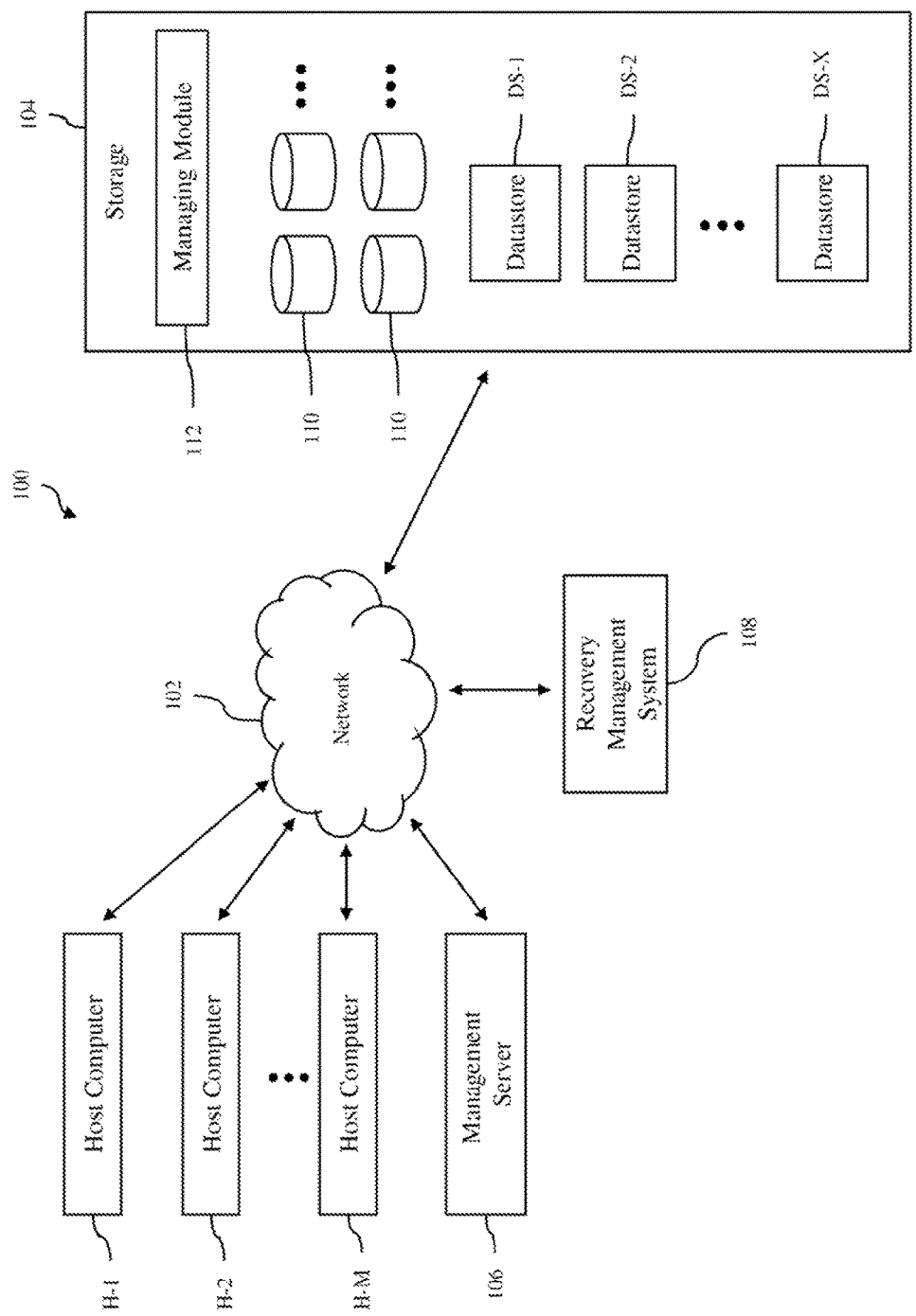
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, a number of host computers H-1, H-2 . . . H-M (where M is a positive integer), storage 104, to management server 106 and a recovery management system 108. The host computers, the storage, the management server and the fault domain management system are connected to the network. Thus, each of these components of the distributed computer system can communicate with each other and access resources available to one or more of these components.

The host computers H-1, H-2 . . . H-M are physical computer systems that hosts or supports one or more clients so that the clients are executing on the physical computer systems. As used herein, "clients" refer to any software entities that can run on a computer system, such as software applications, software processes, virtual machines (VMs) and "containers" that provide system-level process isolation. The host computers may be servers that are commonly found in datacenters. The host computers may be installed in one or more server racks in the same or different facilities.

Figure 2:
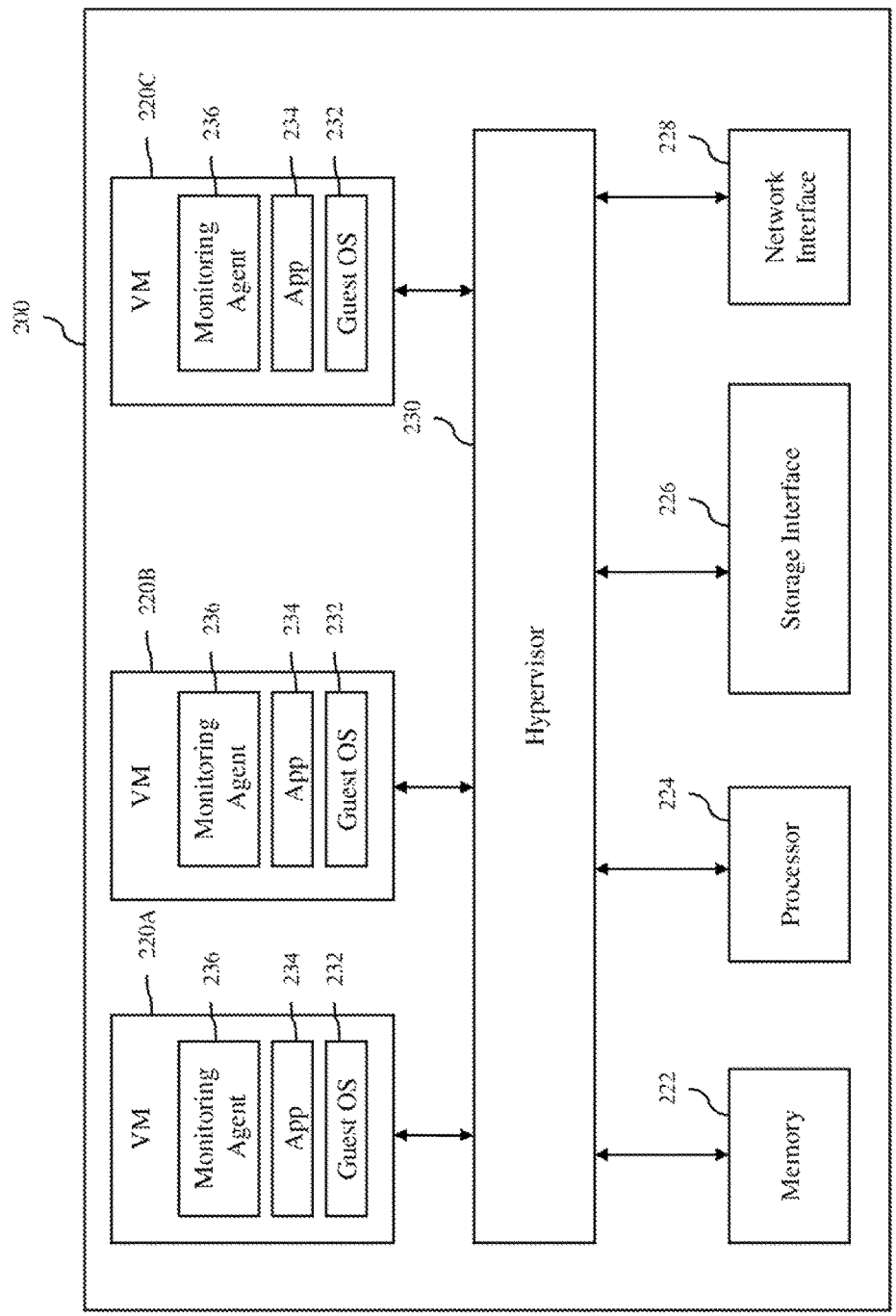
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include one or more system memories 222, one or more processors 224, a storage interface 226, and a network interface 228. Each system memory 222, which may be random access memory (RAM), is the volatile memory of the host computer. Each processor 224 can be any type of a processor, such as a central processing unit (CPU) commonly found in a server. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 232, one or more guest applications 234 and a monitoring agent 236. The guest operating system manages virtual system resources made available to the corresponding VM by the hypervisor, and, among other things, the guest operating system forms a software platform on top of which the guest applications run. The monitoring agent is a software program running in the VM to monitor and report any type of information from the host computer, including communications between the VMs on the host computer to any other entity, which may be external to the host computer.

Similar to any other computer system connected to the network 102, the VMs 220A, 220B . . . 220L are able to communicate with each other using an internal software OSI Layer 2 switch (not shown) and with other computer systems connected to the network using the network interface 228 of the host computer 200. In addition, the VMs are able to access the storage 104 using the storage interface 226 of the host computer.

Turning back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System interface (iSCSI), Fibre Channel over Ethernet (FCoE) and HyperSCSI.

The storage 104 is used to store data for the host computers H-1, H-2 . . . H-M, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical, unit numbers (LUNs).

In an embodiment, the datastores are virtualized representations of storage facilities. Thus, each datastore may use the storage resource from more than one storage device included in the storage. The datastores are used to store data associated with the clients supported by the host computers. For virtual machines, the datastores may be used to store virtual storage, e.g., virtual disks, used by each of the virtual machines, as well as other files needed to support the virtual machines.

The management server 106 operates to monitor and manage the host computers H-1, H-2 . . . H-M, including clients running on the host computers. As an example, the management server may perform resource management operations on the host computers, such as, but not limited to, resource allocation, load balancing and placement of clients on different host computers. In some embodiments, the management server may be a physical computer, and thus, includes memory and one or more processors, as well as other components commonly found in a computer system. In other embodiments, the management server may be implemented as one or more software programs running on one or more physical computers, such as the host computer 200 shown in FIG. 2, or virtual computers, such as the 220A, 220B, . . . 200L. In a particular implementation, the management server is a VMware Center™server, which may include VMware vSphere® Distributed Resource Scheduler™ (DRS).

The recovery management system 108 operates to automatically determine or define logical fault domains to group clients in different logical fault domains so that clients in the same logical fault domains can be restarted together when there is a fault event that affects the host computers on which the clients are running. In addition, the recovery management system operates to automatically prioritize the different logical fault domains in a dynamic manner to ensure that more important groups of logical fault domains get priority over less important groups of logical fault domains. The recovery management system may also allow a user to perform a "what-if" analysis to see what happens to the logical fault domains and the prioritization of the fault domains if one or more input parameters are modified. The recovery management system may also allow a user to perform a predictive analysis to see which client groups of logical fault domains would have and would have not been moved in the near future if the operational trends with respect to the clients continue in the current trajectory.

Figure 3:
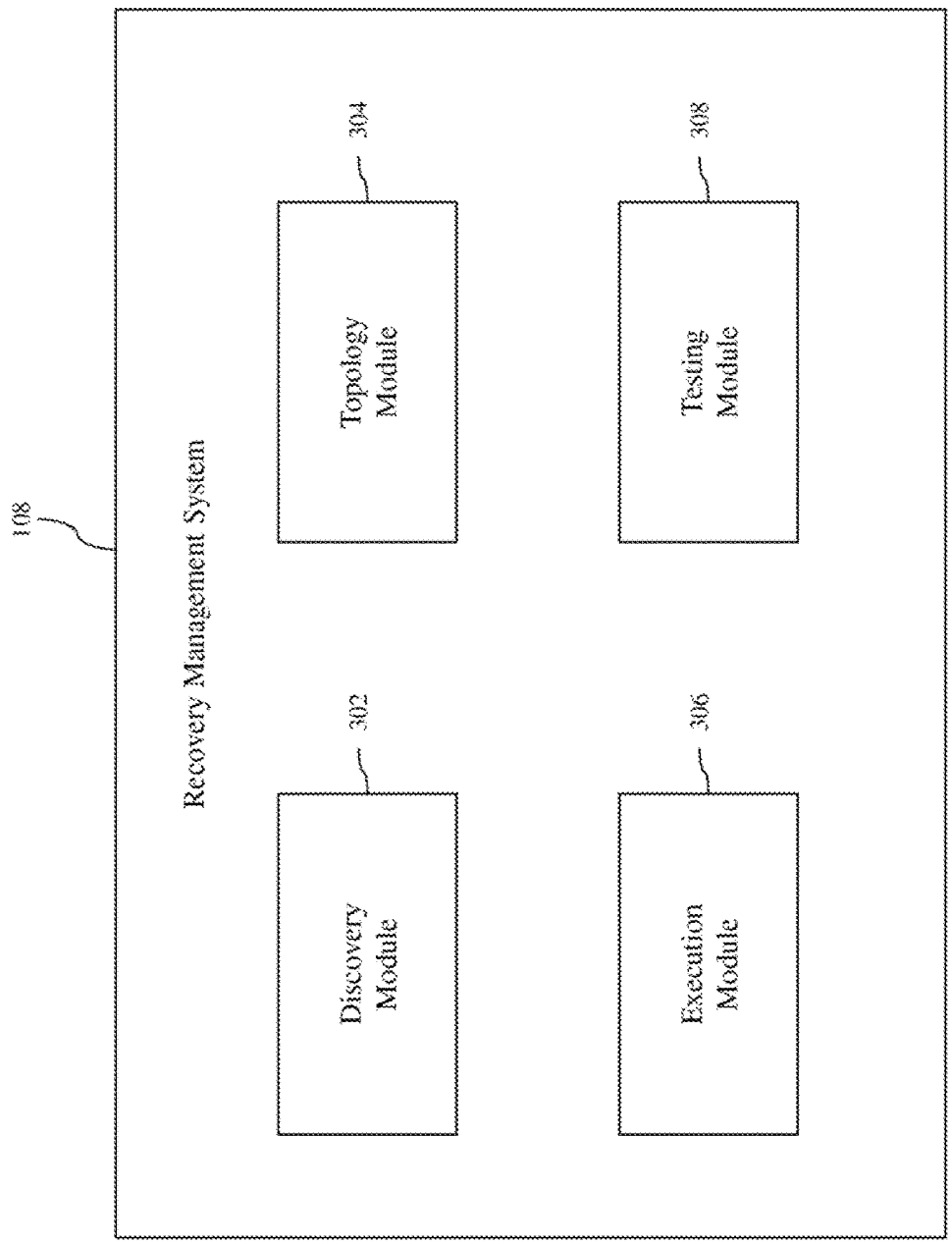
FIG. 3 is a block diagram illustrating components of a recovery management system in accordance with an embodiment of the invention.

Turning now to FIG. 3, components of the recovery management system 108 in accordance with an embodiment of the invention are shown. As illustrated in FIG. 3, the fault domain management system includes a discover module 302, a topology module 304, an execution module 306 and a testing module 308. These components of the recovery management system may be implemented in any combination of hardware, software and firmware. In one implementation, these components of the recovery management system are implemented as one or more software programs running in one or more physical computer systems, such as the host computers H-1, H-2 . . . H-M. In other implementations, these components of the recovery management system are implemented as one or more software programs running on the management server 106 and/or clients running on the different host computers H-1, H-2, . . . H-M using one or more processors associated with the different devices.

The discovery module 302 of the recovery management system 108 operates to understand data traffic flow between clients, e.g., VMs, running on the host computers H-1, H-2, . . . H-M and save this information in a database, which may be stored in any storage accessible by the discovery module, such as the storage 104. As an example, the database used by the discovery module may be a lightweight NoSQL database or a flat file database. In an embodiment, the discovery module may only save data traffic flow information and operational dependencies between the clients. As used herein, operational dependencies between clients refer to clients that receive from or transmit data to another client in order for the application being supported by those clients to perform properly. An upstream dependency is a dependency of a first client with respect to a second client that provides data to the first client. A downstream dependency is a dependency of a first client with respect to a second client that receives data from the first client. In some embodiments, the discovery module may mark the upstream and downstream dependencies between the clients. The discovery module may use active and/or passive methods to gather data traffic flow information and dependencies between the clients. In addition, the discovery module may use analytics to further discover the dependencies between the clients.

Figure 4:
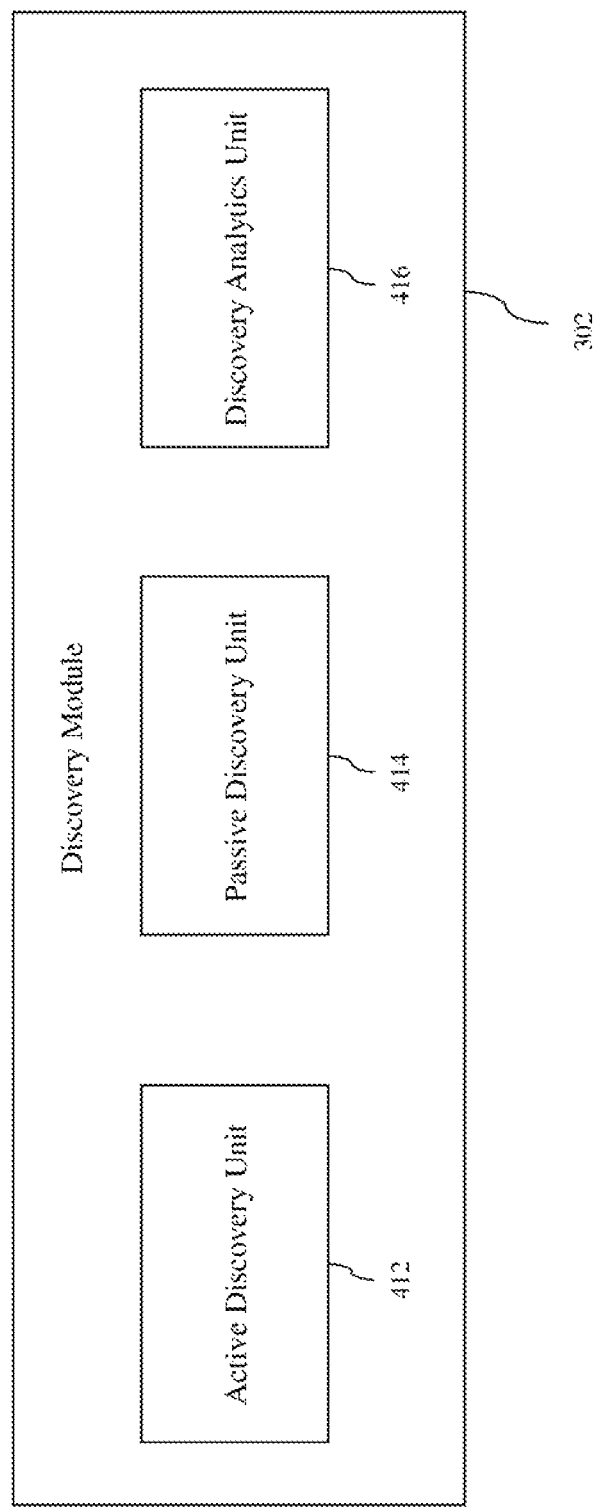
FIG. 4 is a block diagram illustrating components of a discovery module of the recovery management system in accordance with an embodiment of the invention.

In an embodiment, as illustrated in FIG. 4, the discovery module 302 includes an active discovery unit 412, a passive discovery unit 414 and a discovery analytics unit 416. In other embodiments, the discovery module may only one or two of these components. However, having all three of these components in the discovery module would provide more robust results with respect to discovering client dependencies. These components of the discovery module may be implemented in any combination of hardware, software and firmware, in one implementation, these components of the discovery module are implemented as one or more software programs running in one or more physical computer systems, such as the host computers H-1, H-2 . . . H-M, and/or in one or more clients running in the distributed computer system 100.

The active discovery unit 412 operates to collect information regarding the host computers H-1, H-2 . . . H-M in the distributed computer system 100 and services being provided by the clients running on the host computers, such as protocols, ports, services running inside the guest OS, user login and other user related interaction etc. In some embodiments, the active discovery unit may query one or more network components in the distributed computer system to collect the information regarding the host computers and the services. In other embodiments, this information may be mapped to the active discovery unit so that the active discovery unit has access to the information. As an example, the active discovery unit may obtain mapped Configuration Item (CI) data about the host computers. The CI data may include, for example, software and applications running on the host computers, locations and offices in which the host computers are situated or supporting, companies and associated employees and customers, documentations, hardware, and incidents and changes associated with the host computers. This active discovery process performed by the active discovery unit does not require agents and can deliver a wealth of information. A concern with the active discovery process is that the process can place a significant burden on the network. However, since CI data does not change all that often, the active discovery unit may not need to make repeated real-time active discovery in order to collect the latest relevant information.

The passive discovery unit 414 operates to sample network traffic in the distributed computer system 100 to collect more data regarding relationships between clients running in the distributed computer system. In an embodiment, the passive discovery unit uses one or more remote agents to connect to core span or mirror ports on network switches and sample network traffic, which can be processed to identify the host computers, their communications and connections, and what services and protocols are being exchanged at what time. As an example, a JConsole agent (silent heckler) may be used to capture which client, e.g., a virtual machine, is sending what type of remote Call (e.g., HTTP REST, SOAP, SSH etc.) to which other clients, e.g., other virtual machines. As another example, an agent, such as the monitoring agent 236, can sit on each client, e.g., each virtual machine, and monitor its network activity. If network access is barred for this agent, the agent can get to the application log level and extract the information of which client, e.g., VM, it is talking to, over what port and which service or application is sending the outbound call. The agent can also look at the code base of the applications or configuration file for a given application to understand which is the target client to which this client is talking, what protocol is being used, which port etc. For an example, if the client is naming say Microsoft Outlook®, then the client must store the Exchange Server information to whom it is talking. As another example, if the client is a web server, then its configuration will store the middle tier application information. In these examples, the agent can extract the needed information without having to sniff in the network.

The discovery analytics unit 416 operates to perform deep-packet analysis on observed traffic between clients running in the distributed computer system 100 to further establish relationships between the clients, including clients discovered by the active and passive discovery units. For an example, let's assume there is a 3-tier application with an Apache server that runs on ports 80 and 443, a Tomcat application server that runs on port 8443 and a MySQL server that runs on port 4096. Using deep packet analysis, the discovery analytics unit will discover that there is a 3-tier application running across three machines, which would all need to be restarted when there is a failure. The discovery analytics Unit may employ one or more network sniffers to perform to extract network traffic data for deep-packet analysis. The discovery analytics complements the active and passive discovery processes performed by the active and passive discovery units 412 and 414 for application discovery and dependency mapping.

In an embodiment, the discovery analytics unit 416 may also use a use case methodology. In this approach, the discovery analytics unit is provided with different use cases for various applications so that the dependencies of the clients executing the applications are known to the discovery analytics unit. For an application development, a product manager may produce a use case information, which can include dependencies of the clients that will be executing the application. Thus, when that application is going to be deployed in production, the discovery analytics unit may be provided with the available use case dependency information. For example, if an application is VMware vCloud® Air™ application, then a typical use case is to provision a customer and provide the customer a virtual data center (VLD). When the application is deployed, various modules, such as Service Provider (SP), Customer Portal (CP), User Portal (UP) and Subscription Delivery Platform (SDP) modules, would be running on different virtual machines. Since the data communications between these modules to execute the applications are known, the dependencies of the VMs are known, including downstream and upstream dependencies. Thus, the discovery analytics unit can be prepopulated with this use case so that the VM dependencies for this application are known to the discovery analytics unit.

Turning back to FIG. 3, the topology module 304 of the recovery management system 108 operates to use the information from the discovery module 302 to determine the application topology and create logical fault domains. In particular, the topology module maps the dependencies between the clients running the application to determine the logical fault domains. The topology module also prioritizes the logical fault domains so that the application clients can be restarted based on the prioritized logical fault domain.

Figure 5:
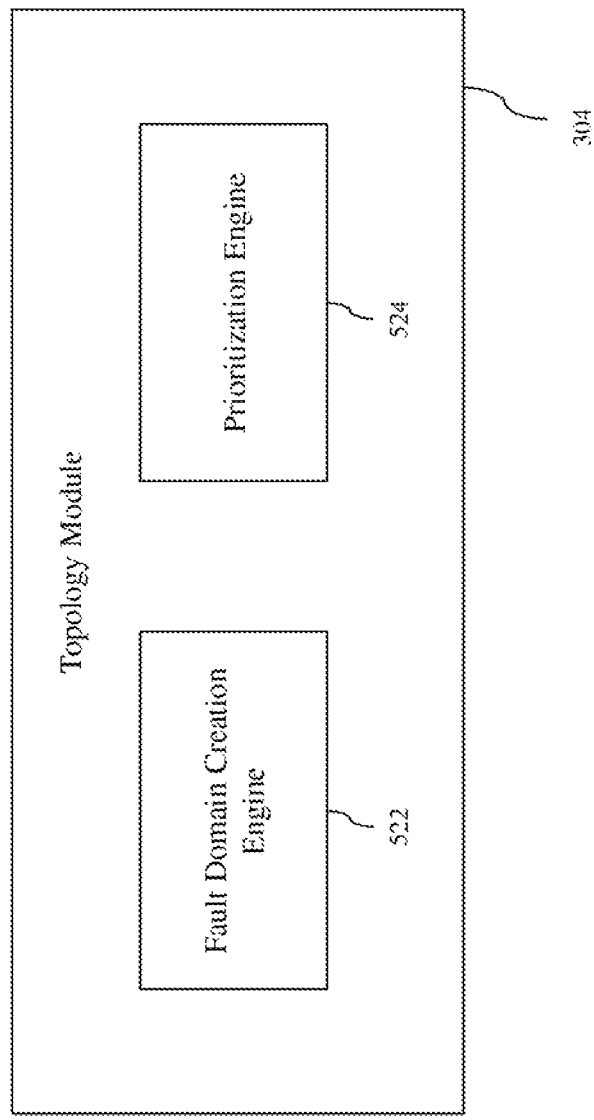
FIG. 5 is a block diagram illustrating components of a topology module of the recovery management system in accordance with an embodiment of the invention.

In an embodiment, as illustrated in FIG. 5, the topology module 304 includes a fault domain creation engine 522 and a prioritization engine 524. The fault domain creation engine executes an algorithm to determine logical fault domains of a particular application. In particular, the fault domain creation engine groups the clients for an application that are dependent to each other in a particular logical fault domain. In an embodiment, the topology module uses a depth-first search (DFS) algorithm to find or determine the logical fault domains for a particular application. However, in other embodiments, the fault domain creation engine may use other algorithms to find or determine the logical fault domains.

The DFS algorithm used by the fault domain creation engine 522 will now be described with the assumption that an application being analyzed includes a number of VMs to perform various functions of the application. The DFS algorithm requires the following definitions and preprocessing settings:

```
ADJ = is an array of lists representing the
     adjacency (or direct dependency) lists
     of every VM.
visited[size(V)]=0
root[SIZE(V)]=0
fault_domain[size(V)]=0
```

Below is a pseudo-code ("DFS( )") of the DFS algorithm used by the fault domain creation engine 522, which includes a VISIT( ) routine.

```
DFS( )
1.  for each vm v in V
2.    if visited(v) == 0
3.      root[v]=1
4.      fault_domain[v]=v
5.      VISIT(v)
VISIT(v)
1.  visited[v]=1
2.  for each u in ADJ[v]
3.    if visited(u) == 0
4.      fault_domain[u]=fault_domain[v]
5.      VISIT(u)
```

The DFS algorithm looks at each VM in the application and determines whether that VM has been already visited. If a VM has not been visited, then a new fault domain is started with that VM being a root of the new fault domain. For the new fault domain, the DFS algorithm then calls the VISIT(v) looking for all the VMs in the ADJ list for the root VM that belong to this new fault domain. For each VM on this "primary" ADJ list, the DFS algorithm marks that VM as being part of this new fault domain and looks at each VM in the "secondary" ADJ list for the VM on the "primary" list and so on until all VMs of the application have been visited.

Figure 6:
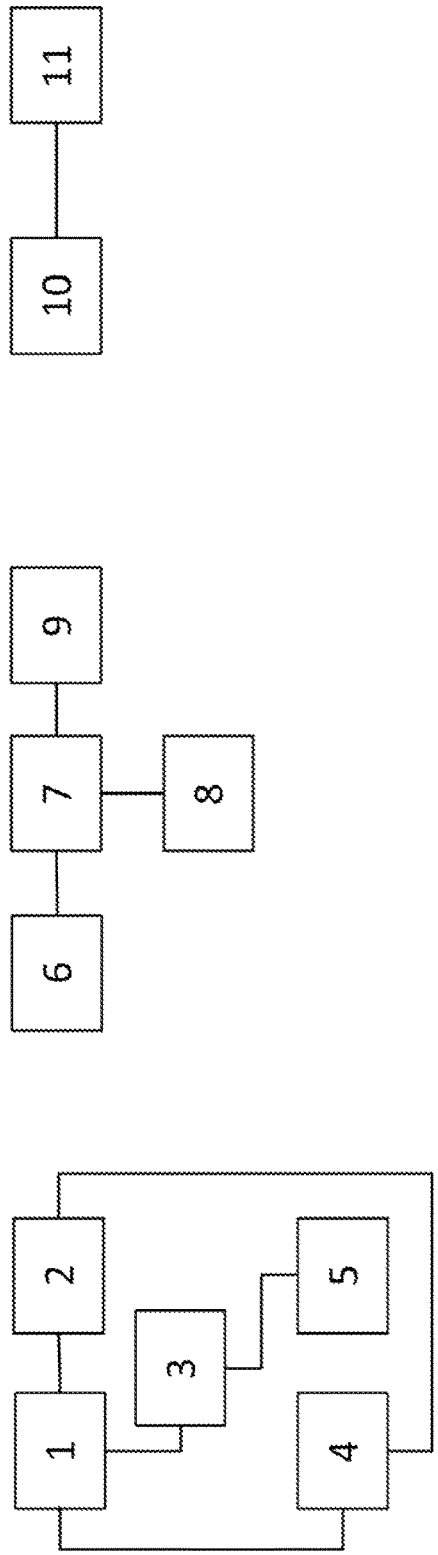
FIG. 6 illustrates an example of virtual machines (VMs) in different logical fault domains.

The DFS algorithm will now be further described using an example shown in FIG. 6. In this example, there are eleven VMs being analyzed, i.e., VM-VM11, which is represented by V=[1, 2, 3, 4, 5, 6, 7, 8, 9, 10, 11]. As illustrated in FIG. 6, the adjacency list for each of these VMs is as follows: ADJ[1]=[2, 3, 4]; ADJ[2]=[1, 4]; ADJ[3]=1, 5], ADJ[4]=[1, 2], ADJ[5]=[3], ADJ[6]=[7], ADJ[7]=[6, 8, 9], ADJ[8]=[7], ADJ[9]=[7], ADJ[10]=[11] and ADJ[11]=[10]. Thus, for example, the adjacency list for VM1 is ADJ[1]=[2, 3, 4], which means that VM2, VM3 and VM4 are VMs that have direct dependencies with VM1. That is, VM2, VM3 and VM4 are dependent on VM1 without any intervening VM between VM1 and each of VM2, VM3 and VM4.

Figure 7A:
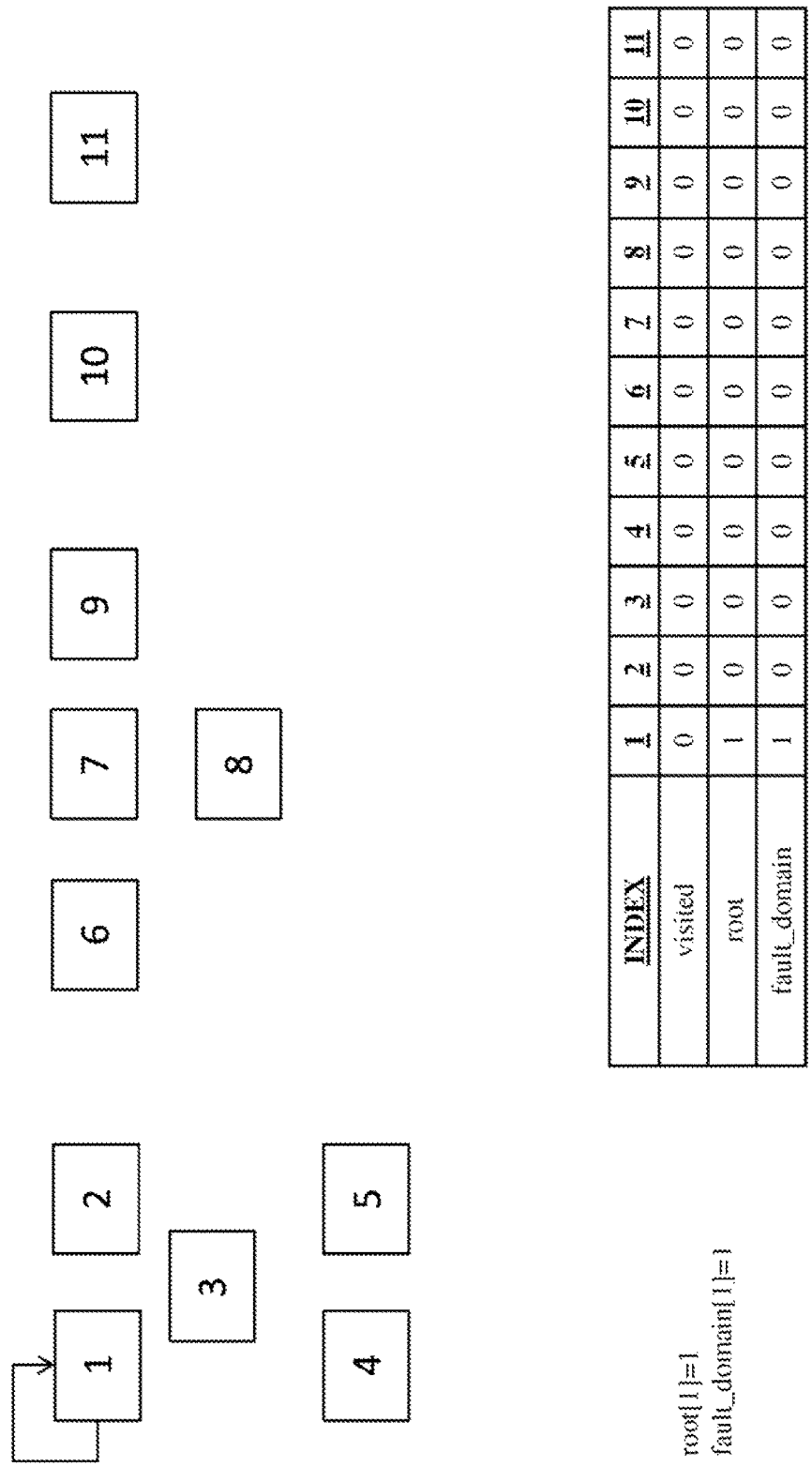
FIGS. 7A-7P illustrate the operation of a depth-first search (DFS) algorithm executed by the topology module of the recovery management system in accordance with an embodiment of the invention.

The operation of the DFS algorithm on the example shown in FIG. 6 will be described with references to FIGS. 7A-7P. As illustrated in FIG. 7A, the DFS algorithm first examines VM1 and determines that visited(1)=0 for VM1. Thus, root[1] is set to 1 and fault_domain[1] is set to 1, which is illustrated in the table in FIG. 7A.

Figure 7B:
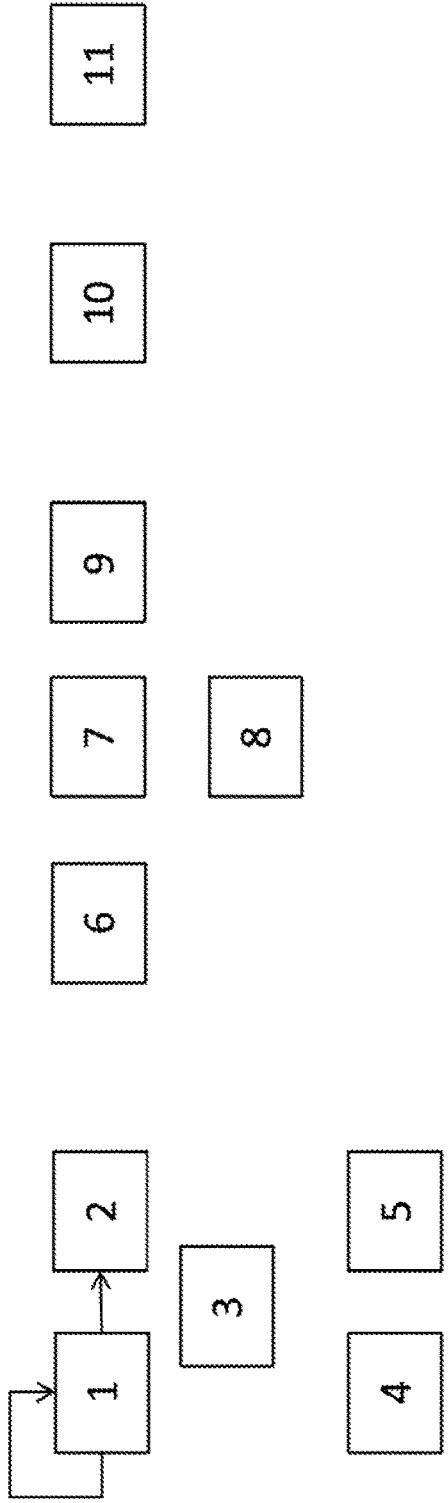
Figure 7C:
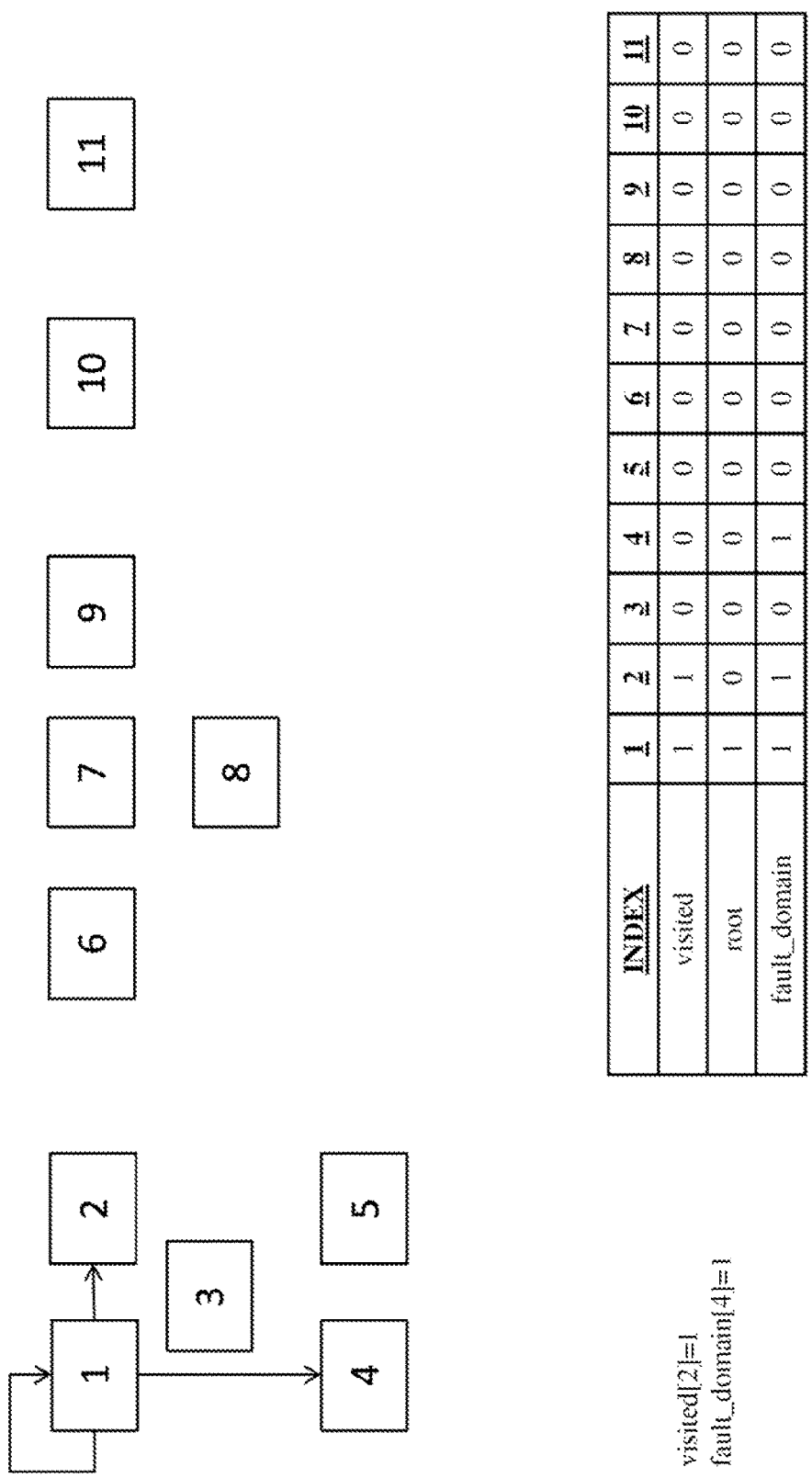
Figure 7D:
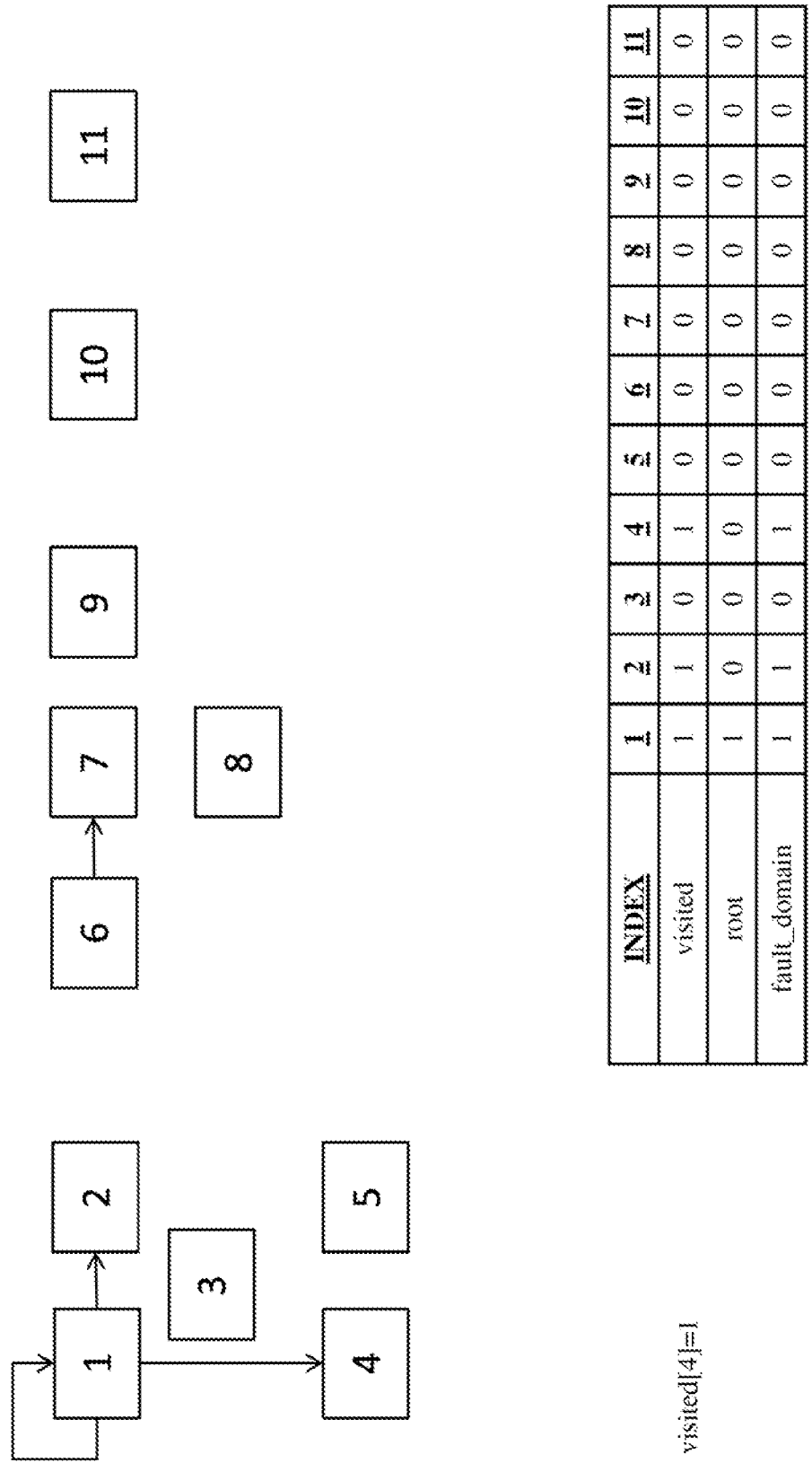

Next, the DFS algorithm performs the VISIT(v) routine for VM1, VISIT(1) and examines VMs in the adjacency list for VM1, which includes VM2, VM3 and VM4. The VISIT (1) routine first examines VM2. As illustrated in FIG. 7B, since visited(2)=0 for VM2, fault_domain[2] is set to 1. The DFS algorithm then executes VISIT(u) routine for VM2, i.e., VISIT(2), and sets visited[2] for VM2 to 1. The VISIT(2) routine then examines VMs in the ADJ(2) list for VM2, which includes VM1 and VM4. Since VM1 has been visited, i.e., visited[1]=1, only VM4 is examined since visited(4)=0 for VM4. Thus, as illustrated in FIG. 7C, fault_domain[4] for VM4 set to 1. The DFS algorithm then executes VISIT (u) routine for VM4, i.e., VISIT(4), and sets visited[4] for VM2 to 1, as illustrated in FIG. 7D. The VISIT(4) routine then examines VMs in the ADJ(4) list for VM4, which includes VM1 and VM2. Since VM1 and VM2 have been visited, no VMs in the ADJ(4) list is considered.

Figure 7E:
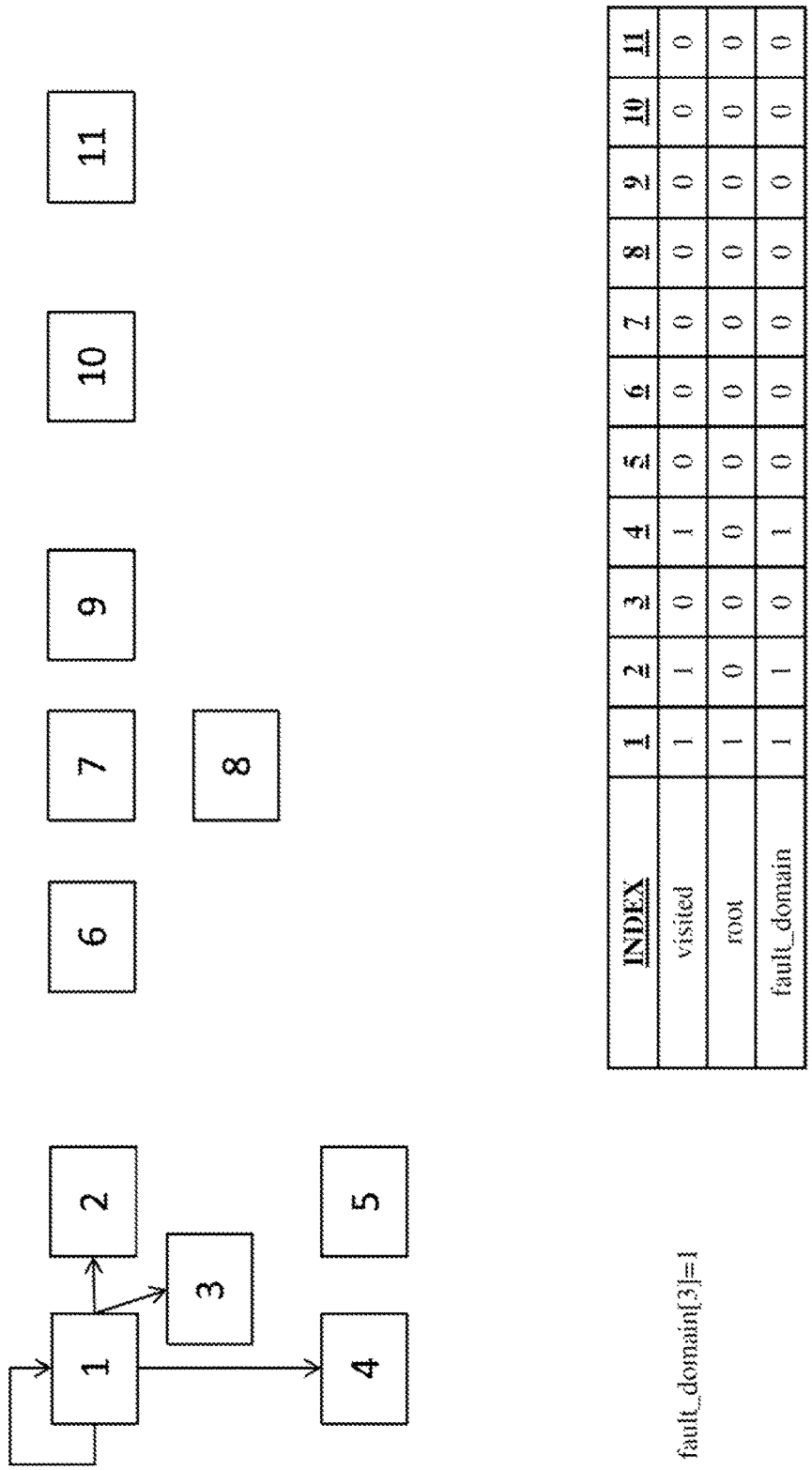
Figure 7F:
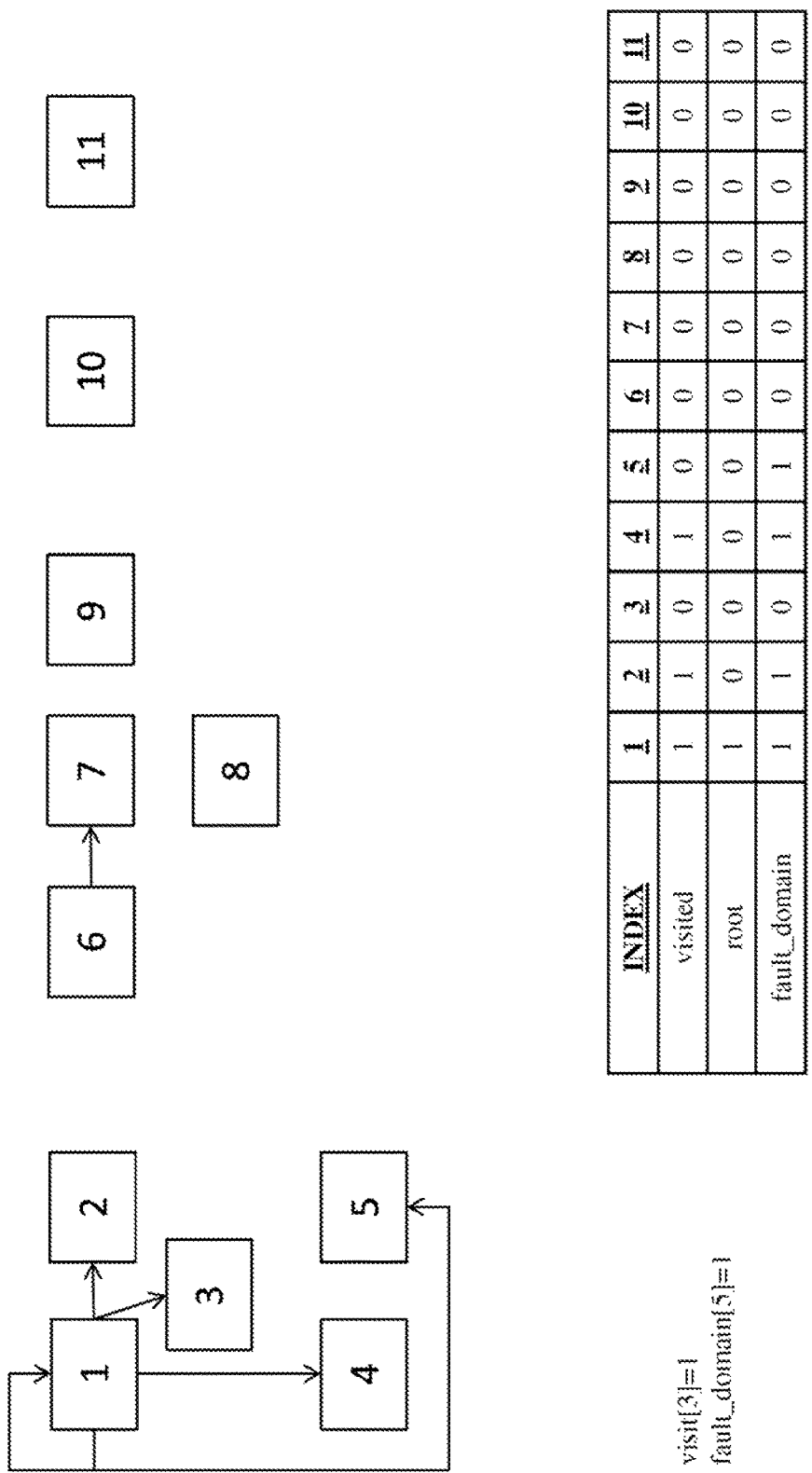
Figure 7G:
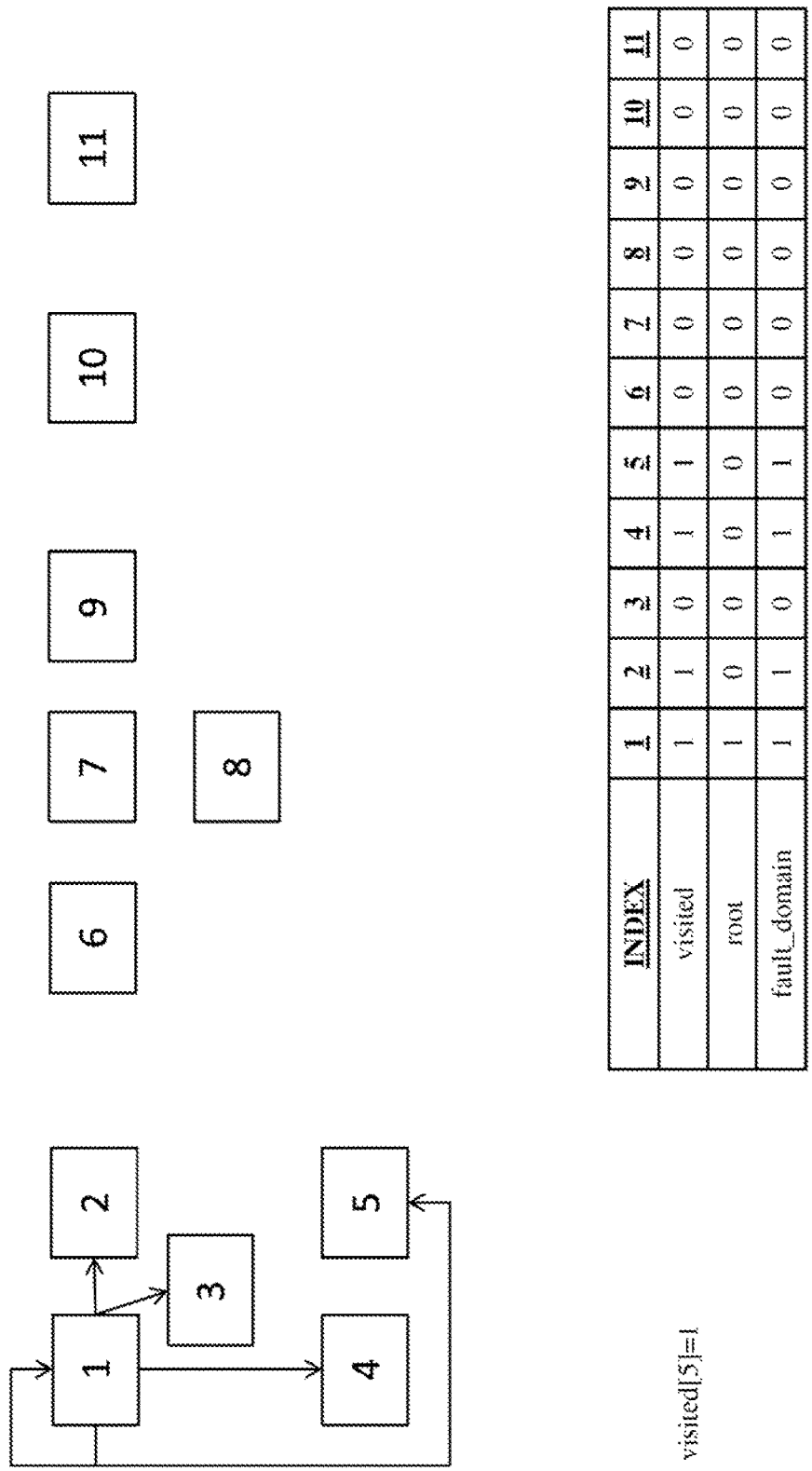

Next, the VISIT(1) routine examines VM3, which is the next VM in the ADJ(1) for VM1 that has not yet been visited. As illustrated in FIG. 7E, the VISIT(1) routine sets fault_domain[3] to 1. The DFS algorithm then executes VISIT(u) routine for VM3, i.e., VISIT(3), and sets visited[3] for VM3 to 1, as illustrated in FIG. 7F. The VISIT(3) routine then examines VMs in the ADJ(3) list for VM3, which includes VM1 and VM5. Since VM1 has been visited, i.e., visited(1)=1, only VM5 is examined since visited(5)=0 for VM5. Thus, as illustrated in FIG. 5F, fault_domain[5] for VM5 is set to 1. The DFS algorithm then executes VISIT(u) routine for VM5, i.e., VISIT(5) and sets visited[5] for VM5 to 1, as illustrated in FIG. 7G. The VISIT(5) routine then examines VMs in the ADJ(5) list for VM5, which includes VM3. Since VM3 has been visited, no VMs in the ADJ(5) list is considered. There are no other VMs in the ADJ(1) list that have not been visited so the DFS algorithm searches for the next VM in V that has not been visited, which is VM6.

Figure 7H:
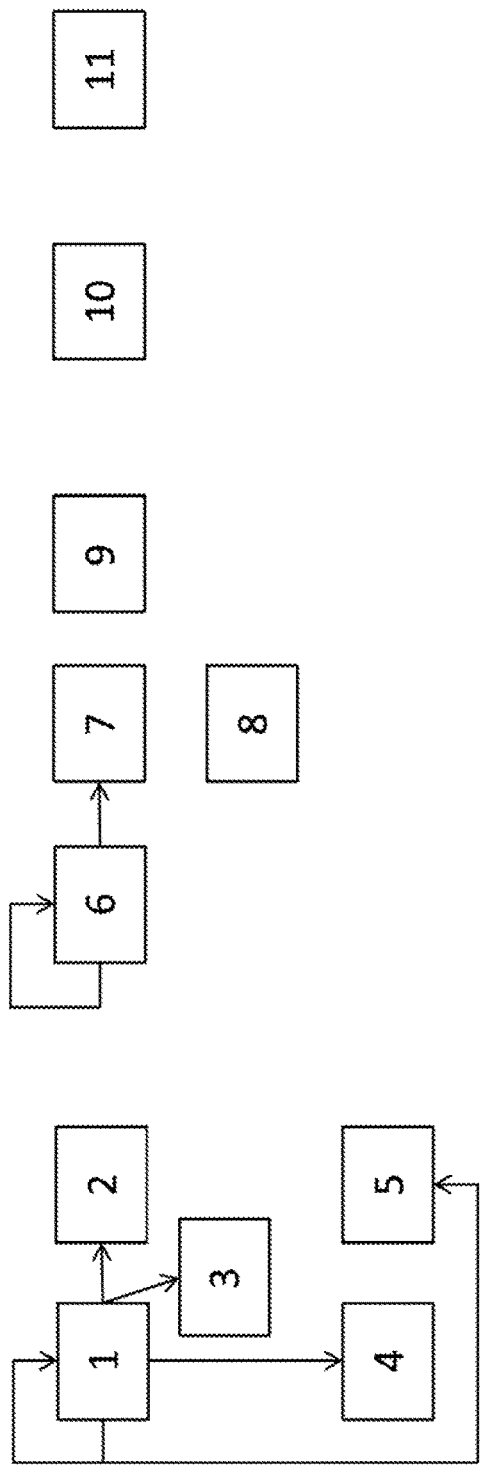

As illustrated in FIG. 7H, the DFS algorithm then examines VM6 and determines that visited(6)=0 for VM6. Thus, root[6] is set to 1 and fault_domain[6] is set to 6, which is illustrated in the table in FIG. 7H.

Figure 7I:
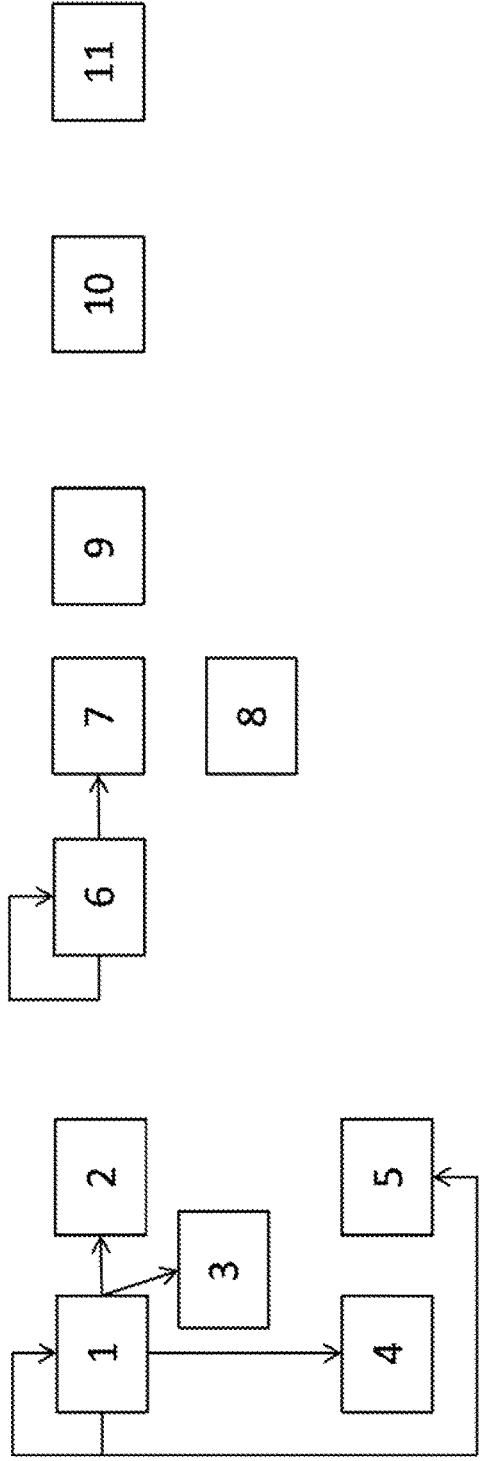
Figure 7K:
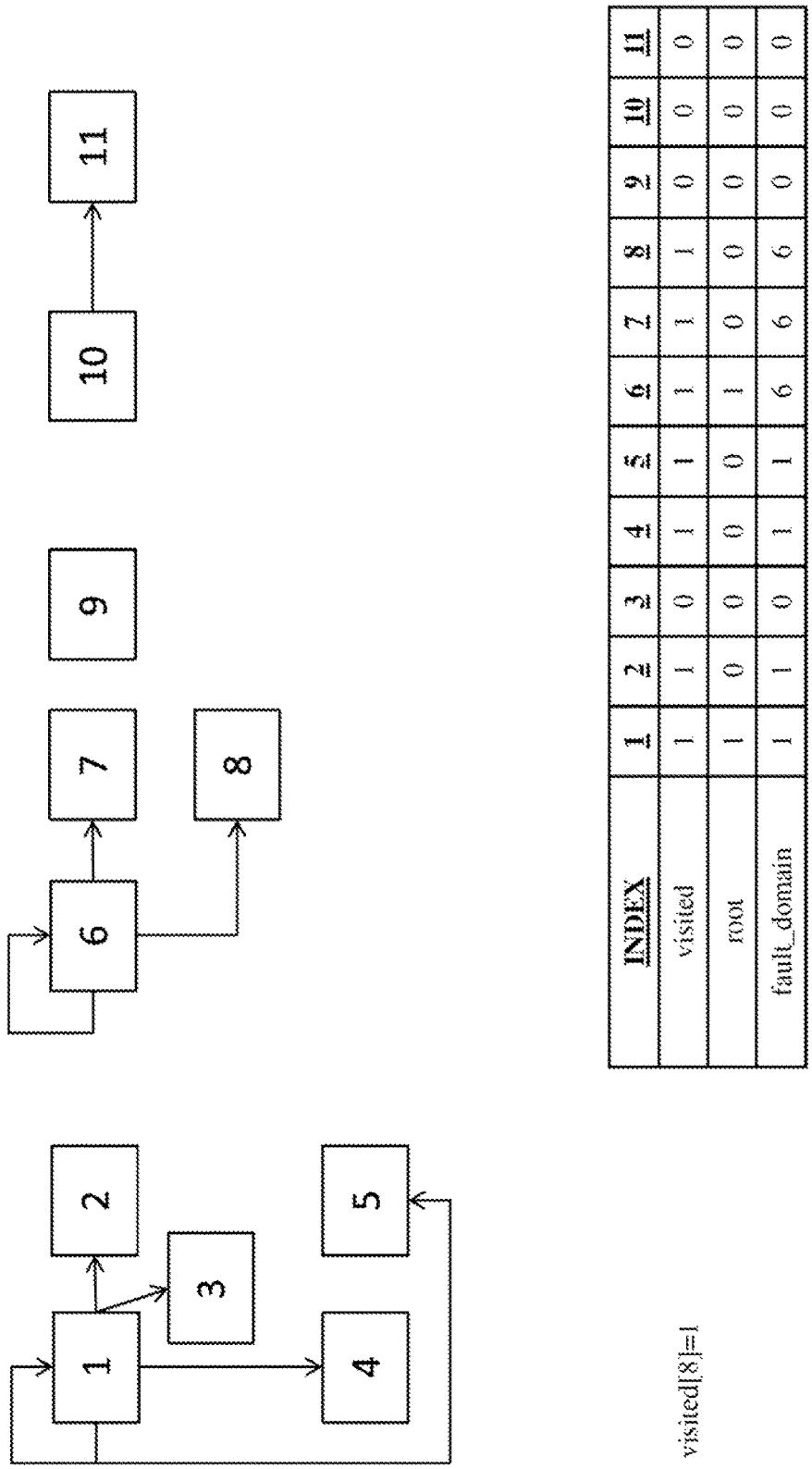

Next, the DFS algorithm performs the VISIT(v) routine for VM6, i.e., VISIT(6), and examines VMs in the adjacency list for VM6, which includes VM7. As illustrated in FIG. 7I, since visited(7)=0 for VM7, fault_domain[7] is set to 1. The DFS algorithm then executes VISIT(u) routine for VM7, i.e., VISIT(7), and sets visited[7] for VM7 to 1. The VISIT(7) routine then examines VMs in the ADJ(7) list for VM7, which includes VM6, VM8 and VM9. Since VM6 has been visited, i.e., visited(6)=1, VM8 is examined since visited(8)=0 for VM8. Thus, as illustrated in FIG. 7J, fault_domain[8] for VM8 is set to 6, The DFS algorithm then executes VISIT(u) routine for VM8, i.e., VISIT(8), and sets visited[8] for VM8 to 1, as illustrated in FIG. 7K, The VISIT(8) routine then examines VMs in the ADJ(8) list for VM8, which includes VM7. Since VM7 has been visited, no VMs in the ADJ(8) list is considered.

Figure 7L:
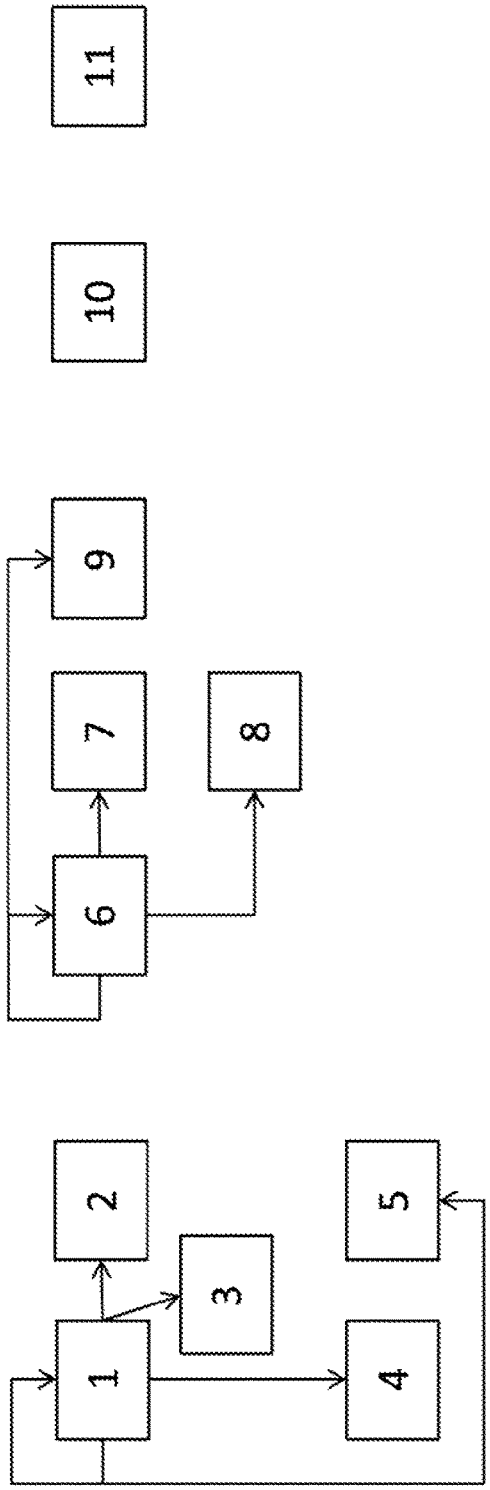
Figure 7M:
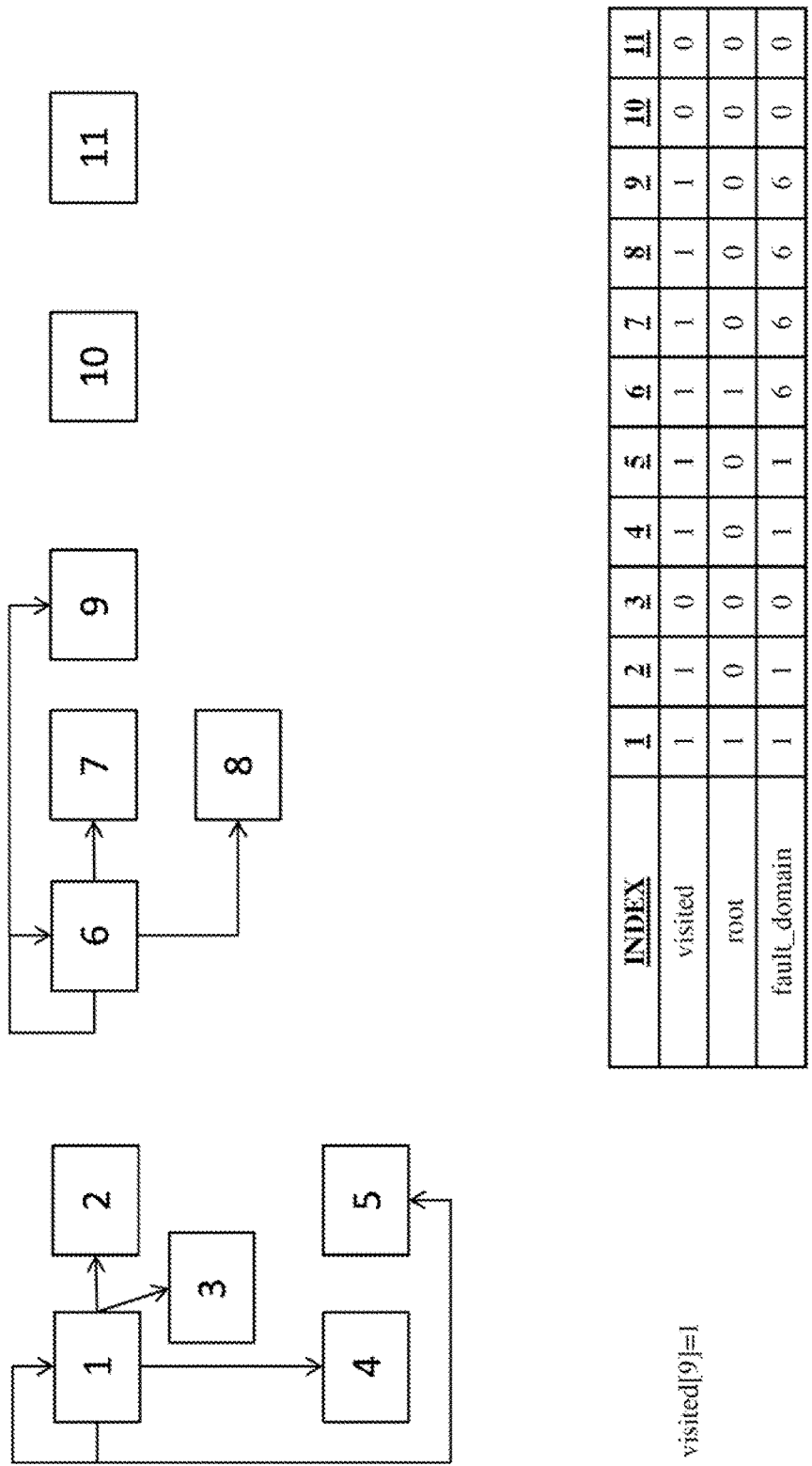

Next, the VISIT(6) routine examines VM9, which is the next VM in the ADJ(6) for VM6 that has not yet been visited. As illustrated in FIG. 7L, the VISIT(6) routine sets fault_domain[9] to 6. The DFS algorithm then executes VISIT(u) routine for VM9, i.e., VISIT(9), and sets visited[9] for VM9 to 1, as illustrated in FIG. 7M. The VISIT(9) routine then examines VMs in the ADJ(9) list for VM9, which includes VM7. Since VM7 has been visited, no VMs in the ADJ(9) list is considered. There are no other VMs in the ADJ(6) list that have not been visited so the DFS algorithm searches for the next VM in V that has not been visited, which is VM10.

Figure 7N:
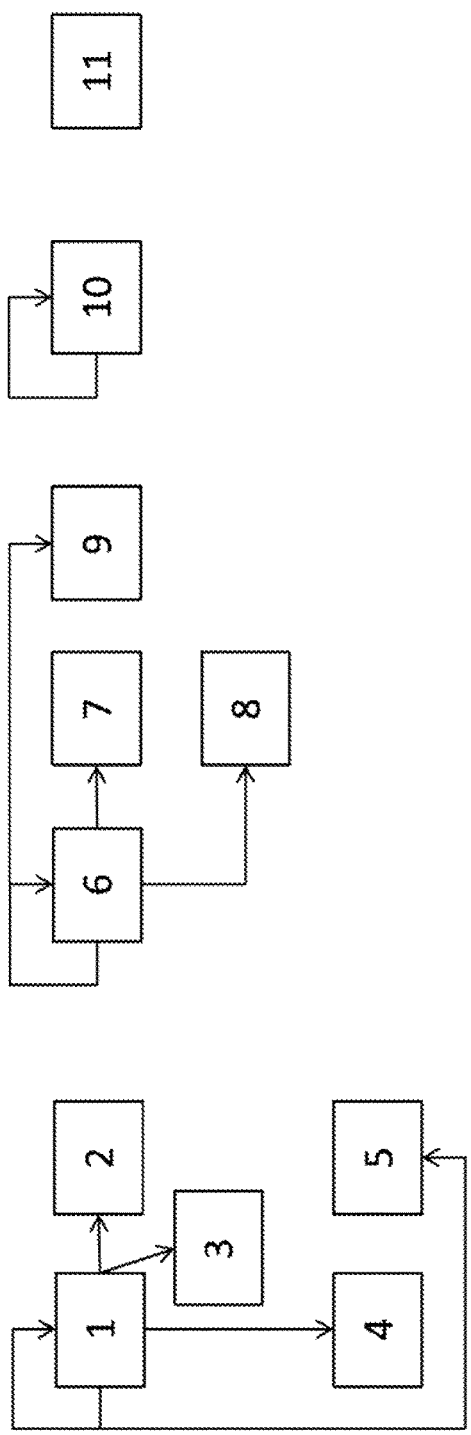

As illustrated in FIG. 7N, the DFS algorithm then examines VM10 and determines that visited(10)=0 for VM10. Thus, root[10] is set to 1 and fault_domain[11] is set to 1, which is illustrated in the table in FIG. 7N.

Figure 7O:
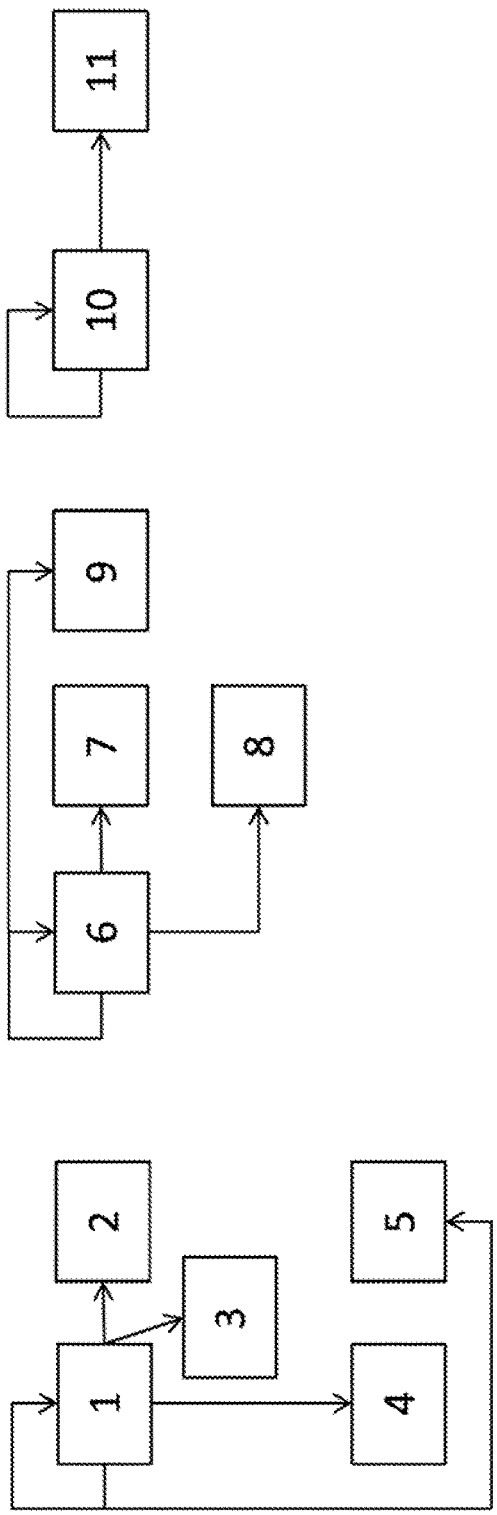

Next, the DFS algorithm performs the VISIT(v) routine for VM10, i.e., VISIT(10), and examines VMs in the adjacency list for VM10, which includes VM11. As illustrated in FIG. 7O, since visited(11)=0 for VM11, fault_domain[11] is set to 10. The DFS algorithm then executes VISIT(u) routine for VM11, i.e., VISIT(11), and sets visited[11] for VM11 to 1, as illustrated in FIG. 7P. The VISIT(11) routine then examines VMs in the ADJ(11) list for VM11, which includes VM10. Since VM10 has been visited, no VMs in the ADJ(11) list is considered. There are no other VMs in V that have not been visited. Thus, the DFS algorithm comes to an end.

Figure 7P:
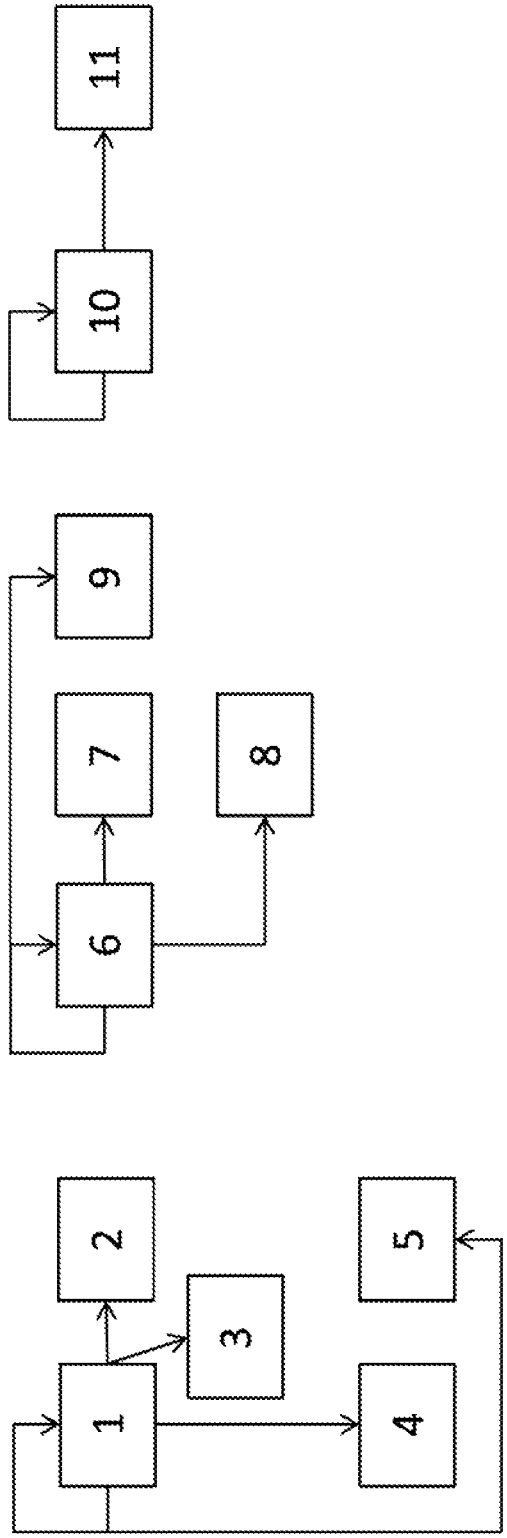

The results of the DFS algorithm can be seen in the table in FIG. 7P. The DFS algorithm has visited, all the VMs in V and has defined all the logical fault domains. In particular, the DFS algorithm has defined a first fault domain, i.e., fault_domain 1, as including VM1-VM5, a second fault domain, i.e., fault_domain 6, as including VM6-VM8, and a third fault domain, i.e., fault_domain 10, as including VM10 and VM11.

Turning back to FIG. 5, the prioritization engine 524 of the topology module 304 operates to prioritize the different fault domains determined by the fault domain creation engine 522 so that when a fault event occurs, the restarting of the clients, e.g., VMs, belonging to the different fault domains can be based on the prioritization of the fault domains. The prioritization engine provides dynamic prioritization of the fault domains based on different characteristics of the fault domains. In an embodiment, the prioritization engine uses two characteristics of the fault domains: (1) size of fault domain and (2) interaction with an external, network or storage. In one implementation, size of fault domain is defined as the CPU and memory requirements of that fault domain, and interaction with an external network or storage is defined as a metric that defines how much traffic does this fault domain send to or receive from the outside network and/or the storage. These metrics can be in any units. As an example, the size of fault domain may simply be a number that is the sum of CPU requirement in megahertz (MHz) and memory requirement in gigabytes (GB). The interaction metric may be in megabytes per second (MB/s). In other embodiments, the prioritization engine may use any number of characteristics of the fault domains to prioritize the different fault domains.

In some embodiments, the prioritization engine 524 allows a user, such as an administrator, to define the importance of the characteristics being considered for prioritization using a user interface, such as a graphic user interface. In the embodiment in which the prioritization engine uses size of fault domain and interaction characteristics of the fault domains, the user may be allowed to define how important these characteristics are for prioritization based on a scale of for example, 1 to 100, which may represent percentage. The prioritization engine then prioritizes the fault domains by computing priority scores based on the metrics for size of fault domain and interaction characteristics of the fault domains and the user-provided scale numbers. In one implementation, the prioritization engine uses the user-provided scale numbers as weights for the metrics for size of fault domain and user interaction characteristics of the fault domains and then sums up the values to derive the priority scores. As an example, let's assume that there are three fault domains, FD1, FD2 and FD3. The interaction metrics of FD1, FD2 and FD3 are 50, 80 and 70, respectively. The resources sizes of FD1, FD2 and FD3 are 40, 70 and 50, respectively. The user-provided scale numbers may be 70% for the interaction metric and 30% for the fault domain size. Using these parameters, the prioritization engine would compute the priority scores for FD1, FD2 and FD3. The results of the computations are provided in the following table.

| FAULT DOMAIN | INTERACTION | SIZE | PRIORITY SCORE |
|---|---|---|---|
| FD1 | 50 | 40 | 50 * 0.7 + (100 − 40) * 0.3 = 53 (P2) |
| FD2 | 80 | 70 | 80 * 0.7 + (100 − 70) * 0.3 = 65 (P0) |
| FD3 | 70 | 50 | 70 * 0.7 + (100 − 50) * 0.3 = 64 (P1) |

As shown in the above table, the priority scores for FD1, FD2 and FD3 are 53, 65 and 64, respectively. The prioritization engine 524 would then prioritize the fault domains using the derived priority scores. In this example, the prioritization engine would give the highest priority to the fault domain with the highest priority score. Thus, in this example, the highest priority (P0) is given to FD2 with a priority score of 65, the second highest priority (P1) is given to FD3 with a priority score of 64 and the lowest priority (P2) is given to FD1 with a priority score of 53.

Turning back to FIG. 3, the execution module 306 of the recovery management system 108 operates to initiate a fault recovery process when a fault event has been detected. The fault recovery process involves restarting the clients that are affected by the fault event in one or more host computers, which are not affected by the fault event. Thus, one or more applications may be restarted when a fault event is detected. The execution module uses the fault domain prioritization determined by the prioritization engine to restart the clients, e.g., VMs, belonging to the different fault domains in the order defined by the fault domain prioritization. Thus, in the previous example, if FD1, FD2 and FD3 are all affected by a fault event, the execution module will restart the VMs belonging to FD2 first, the VMs belonging to FD3 second and then the VMs belong to FD1. For site recovery, there may be a corresponding execution module on a different site to recover clients at that site.

The testing module 308 of the recovery management system 108 operates to allow a user, such as an administrator, to perform "what if" analysis. Once the recovery management system has enough data to compute the key metrics, the testing module allows a user to modify the input values and see the resulting priorities of fault domains using a user interface, such as a GUI tool embedded into the vSphere® vCenter™ Web Client. In some embodiments, the input values that can be modified include the user-provided scale numbers. In other embodiments, the input values that can be modified may also include the fault domain characteristic metrics, such as the fault domain size and interaction metrics, or any other values used by recovery management system to determine fault domains or prioritization of the fault domains. The testing module may also be configured to perform a predictive analysis to show what could have happened and what can happen in near future if current trends with respect to one or more applications executed by clients running on the distributed computer system continue in the current trajectory. In some embodiments, the testing module may use other components in the distributed computer system 100 to perform its operation. For example, the testing module may use the prioritization module 524 to perform "what if" analysis with respect to prioritization of fault domains. As another example, the testing module may use the discovery module to predict future interaction metrics for the different fault domains.

Figure 8:
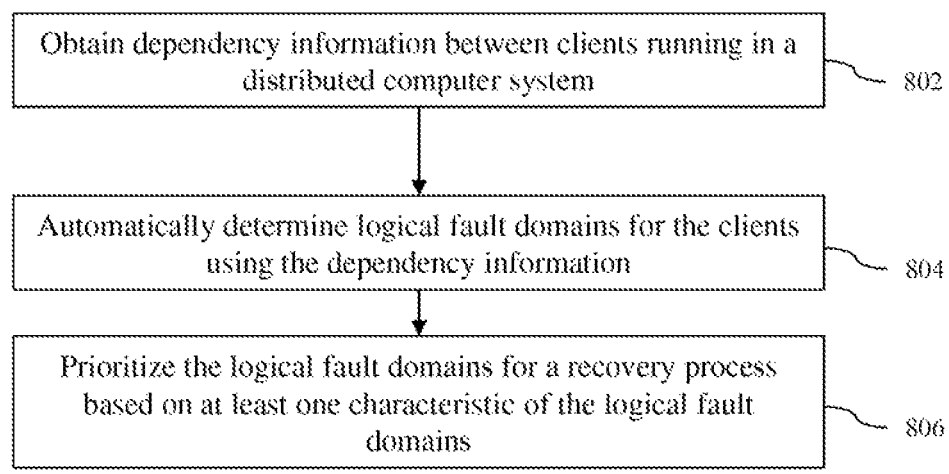
FIG. 8 is a flow diagram of a recovery method in accordance with an embodiment of the invention.

A recovery method in accordance with an embodiment of the invention is described with reference to a flow diagram of FIG. 8. At block 802, dependency information between clients running in a distributed computer system is obtained. The dependency information may be derived using an active discovery process, a passive discovery process and/or a discovery analytics process. At block 804, logical fault domains for the clients is automatically determined using the dependency information. The logical fault domains may be determined using a depth-first search (DFS) algorithm. At block 806, the logical fault domains for a recovery process are prioritized based on at least one characteristic of the logical fault domains, which may be scaled using a user-provided scale value. The logical fault domains are used to ensure that all the clients for a particular logical fault domain are restarted together in a recovery process so that the services provided by those clients can be restored. The prioritization of the logical fault domains is used to ensure that the clients of more important fault domains are restarted before the clients of less important fault domains.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A recovery method comprising:
   obtaining dependency information between clients running in a distributed computer system;
   automatically determining logical fault domains for the clients using the dependency information, wherein determining the logical fault domains comprises:
      grouping the clients into different logical fault domains based on the dependency information such that clients in a same logical fault domain are restarted together during a fault event;
   prioritizing the logical fault domains for a recovery process based on at least one characteristic of the logical fault domains, wherein the at least one characteristic comprises a size of each logical fault domain and/or an interaction of each logical fault domain with an external network or storage; and
   performing the recovery process by restarting the clients based on the prioritized logical fault domains in response to the fault event.

2. The recovery method of claim 1, wherein obtaining the dependency information includes actively discovering the dependency information between the clients by querying host computers in the distributed computer system on which the clients are being hosted.

3. The recovery method of claim 1, wherein obtaining the dependency information includes passively discovering the dependency information between the clients by sampling data traffic between the clients.

4. The recovery method of claim 1, wherein obtaining the dependency information includes performing deep packet analysis on the data traffic between the clients.

5. The recovery method of claim 1, wherein automatically determining the logical fault domains for the clients includes grouping the clients that are dependent to each other in a particular logical fault domain.

6. The recovery method of claim 5, wherein automatically determining the logical fault domains for the clients includes performing a depth-first search (DFS) algorithm to group the clients into the different logical fault domains.

7. The recovery method of claim 1, wherein prioritizing the logical fault domains includes computing priority scores for the logical fault domains using at least one of a metric for logical fault domain size and a metric for interaction with an external network or storage for the logical fault domains.

8. The recovery method of claim 7, wherein computing the priority scores for the logical fault domains includes scaling the metric for logical fault domain size or the metric for interaction using a user-provided scale value.

9. The recovery method of claim 8, wherein computing the priority scores includes adding a scaled metric for size of each logical fault domain and a scaled metric for interaction for a particular logical fault domain to derive a priority score for the particular logical fault domain.

10. The recovery method of claim 1, wherein performing the recovery process by restarting the clients based on the prioritized logical fault domains comprises restarting the clients of a logical fault domain with a highest priority score before the clients of another logical fault domain with a lower priority score in response to the fault event.

11. A non-transitory computer-readable storage medium containing program instructions for a recovery method, wherein execution of the program instructions by one or more processors of a computer system causes the one or more processors to perform steps comprising:
   obtaining dependency information between clients running in a distributed computer system;
   automatically determining logical fault domains for the clients using the dependency information, wherein determining the logical fault domains comprises:
      grouping the clients into different logical fault domains based on the dependency information such that clients in a same logical fault domain are restarted together during a fault event;
   prioritizing the logical fault domains for a recovery process based on at least one characteristic of the logical fault domains, wherein the at least one characteristic comprises a size of each logical fault domain an/or an interaction of each logical fault domain with an external network or storage; and
   performing the recovery process by restarting the clients based on the prioritized logical fault domains in response to the fault event.

12. The non-transitory computer-readable storage medium of claim 11, wherein obtaining the dependency information includes actively discovering the dependency information between the clients by querying host computers in the distributed computer system on which the clients are being hosted.

13. The non-transitory computer-readable storage medium of claim 11, wherein obtaining the dependency information includes passively discovering the dependency information between the clients by sampling data traffic between the clients.

14. The non-transitory computer-readable storage medium of claim 11, wherein obtaining the dependency information includes performing deep packet analysis on the data traffic between the clients.

15. The non-transitory computer-readable storage medium of claim 11, wherein automatically determining the logical fault domains for the clients includes grouping the clients that are dependent to each other in a particular logical fault domain.

16. The non-transitory computer-readable storage medium of claim 15, wherein automatically determining the logical fault domains for the clients includes performing a depth-first search (DFS) algorithm to group the clients into the different logical fault domains.

17. The non-transitory computer-readable storage medium of claim 11, wherein prioritizing the logical fault domains includes computing priority scores for the logical fault domains using at least one of a metric for logical fault domain size and a metric for interaction with an external network or storage for the logical fault domains.

18. The non-transitory computer-readable storage medium of claim 17, wherein computing the priority scores for the logical fault domains includes scaling the metric for logical fault domain size or the metric for interaction using a user-provided scale value.

19. The non-transitory computer-readable storage medium of claim 18, wherein computing the priority scores includes adding a scaled metric for size of each logical fault domain and a scaled metric for interaction for a particular logical fault domain to derive a priority score for the particular logical fault domain.

20. The non-transitory computer-readable storage medium of claim 11, wherein performing the recovery process by restarting the clients based on the prioritized logical fault domains comprises restarting the clients of a logical fault domain with a highest priority score before the clients of another logical fault domain with a lower priority score in response to the fault event.

21. A recovery management system in a distributed computer system comprising:
 a processor; and
 memory coupled to the processor, wherein the memory comprises:
  a discovery module configured to obtain dependency information between clients running in the distributed computer system;
  a topology module configured to automatically determine logical fault domains for the clients using the dependency information, wherein the topology module is to:
   group the clients into different logical fault domains based on the dependency information such that clients in a same logical fault domain are restarted together during a fault event;
  a prioritization module configured to prioritize the logical fault domains for a recovery process based on at least one characteristic of the logical fault domains, wherein the at least one characteristic comprises a size of each logical fault domain and/or an interaction of each logical fault domain with an external network or storage; and
  an execution module configured to perform the recovery process by restarting the clients based on the prioritized logical fault domains in response to the fault event.

22. The system of claim 21, wherein the discovery module is configured to actively discover the dependency information between the clients by querying host computers in the distributed computer system on which the clients are being hosted.

23. The system of claim 21, wherein the discovery module is configured to passively discover the dependency information between the clients by sampling data traffic between the clients.

24. The system of claim 21, wherein the discovery module is configured to perform deep packet analysis on the data traffic between the clients to discover the dependency information between the clients.

25. The system of claim 21, wherein the topology module is configured to group the clients that are dependent to each other in a particular logical fault domain.

26. The system of claim 25, wherein the topology module is configured to perform a depth-first search (DFS) algorithm to group the clients into the different logical fault domains.

27. The system of claim 21, wherein the topology module is configured to compute priority scores for the logical fault domains using at least one of a metric for logical fault domain size and a metric for interaction with an external network or storage for the logical fault domains.

28. The system of claim 27, wherein the topology module is configured to scale the metric for logical fault domain size or the metric for interaction using a user-provided scale value to compute the priority scores for the logical fault domains.

29. The system of claim 28, wherein the topology module is configured to add a scaled metric for size of each logical fault domain and a scaled metric for interaction for a particular logical fault domain to derive a priority score for the particular logical fault domain.

30. The system of claim 21, wherein the execution module configured to restart the clients of a logical fault domain with a highest priority score before the clients of another logical fault domain with a lower priority score in response to the fault event.

* * * * *